April 7, 1931. L. A. HURLBURT 1,799,588
GREEN CORN HULLER
Filed Sept. 30, 1929
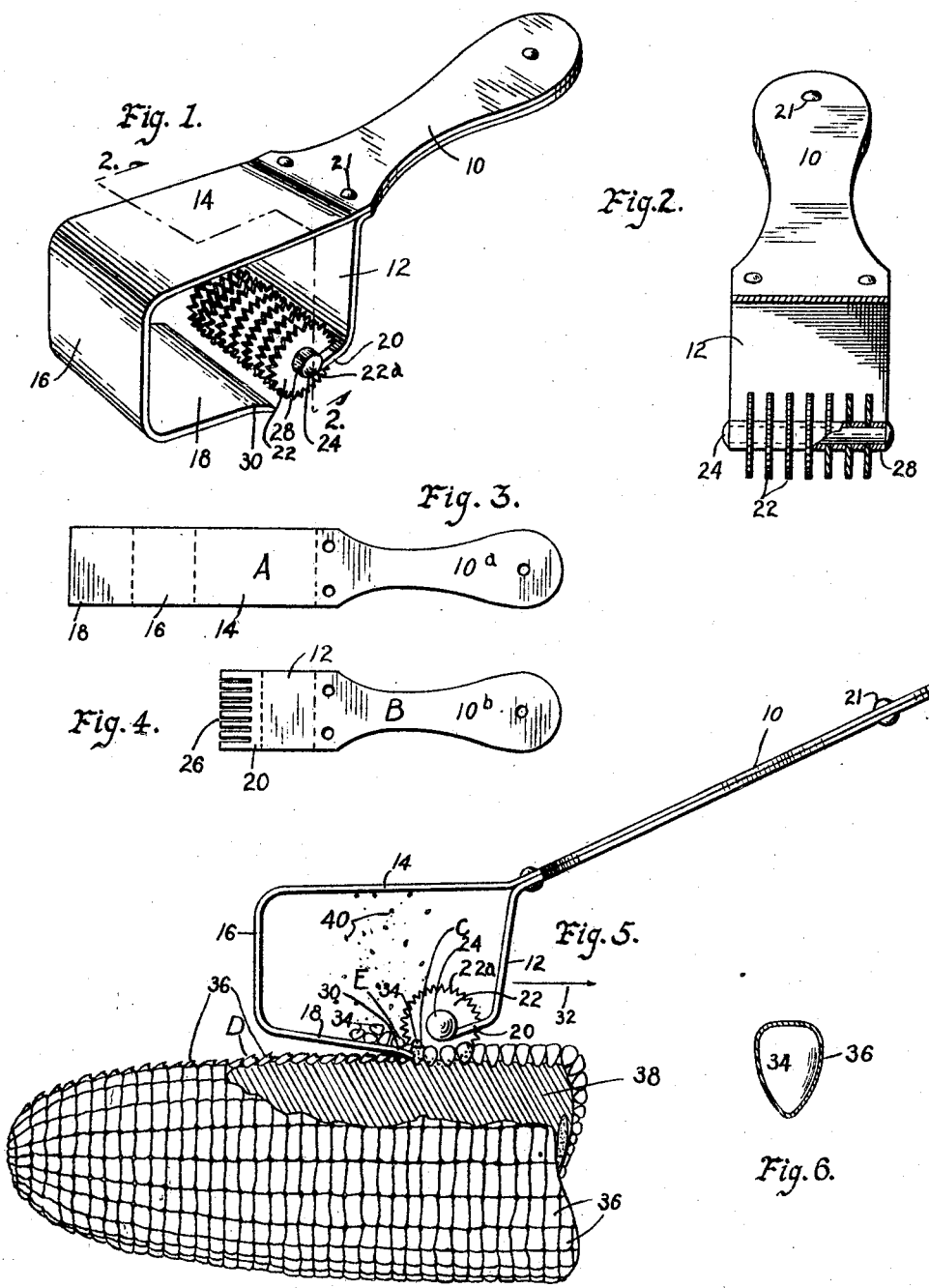

Patented Apr. 7, 1931

1,799,588

UNITED STATES PATENT OFFICE

LEW A. HURLBURT, OF PERRY, IOWA

GREEN-CORN HULLER

Application filed September 30, 1929. Serial No. 396,120.

The object of my invention is to provide a green corn huller of simple, durable and comparatively inexpensive construction.

Another object is to provide a green corn huller of improved construction when compared with the huller illustrated in my patent application, Serial Number 329,323, filed December 31, 1928, and of which the present application is a continuation in part.

More particularly it is my object to provide a device which may be used for green corn on the cob in such a way that it will remove the edible portion of the kernels from their hulls and leave the hulls on the cob.

Still a further object is to provide a device which at the same time scrapes the cob so that all juice in the hulls of the kernels is extracted therefrom with the edible portion of the kernels.

It may here be mentioned that a kernel of green corn has a thin hull which is not edible and which affects many people's stomachs when they eat green corn. The hull ferments in the stomach. Furthermore, it is tough and therefore hard to chew with the consequent result that many of the kernels are swallowed whole instead of being properly chewed by the teeth. The hull of the kernel itself has no food value.

It is, therefore, obvious that a device which will remove the edible portion of the kernel from its hull is very desirable.

It is a further object of my invention to provide such a device which will remove kernels from their hulls quickly and in such a way that all of the material having food value is removed from the cob.

Still a further object is to provide in such a device, a guard to catch the splattering juice from the kernels of the corn so that it is not precipitated upon the operator.

Ordinarily, corn is removed from the cob by first cutting it therefrom by a knife and then using the back of the knife for scraping out the base portion of the kernels which remain on the cob and for removing some of the juice therefrom. This calls for two operations and the juice in being removed splatters about in an undesired manner.

More particularly it is my object to provide a corn huller having means for fracturing the hull of the kernels, such means consisting of discs with notched edges rotatably located through slots for the purpose of keeping them clean, the notches being for the purpose of readily fracturing the hulls of the kernels even after the device has been used a considerable length of time.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my device.

Figure 2 is a detail sectional view of the same on the line 2—2 of Figure 1.

Figure 3 is a lay-out view, of a portion of the body of the device showing the shape of a strip of metal from which such portion may be made.

Figure 4 is a similar lay-out view of another portion of the body. On the accompanying drawings I have used the reference numeral 10 to indicate generally a handle portion of my device.

My device further includes a front wall 12, top wall 14, rear wall 16 and blade 18. The front wall 12 terminates in a rearwardly extending plate 20 having a series of discs 22 supported thereby.

The portions 10, 12, 14, 16, 18 and 20 of my device may be formed of two pieces of metal A and B, the handle 10 being formed by handle members 10a and 10b formed of the metal of the members A and B respectively. The handle portions 10a and 10b may be riveted together as at 21 or spot-welded as found desirable. The various bends of the members A and B are indicated by dotted lines 3 and 4.

The discs 22 are supported on a round shaft 24 and extend into slots 26 formed in the portion 20 of the member B.

The extremities of the fingers formed by cutting the slots 26 are bent to form eyes 28 which encircle and support the shaft 24.

The peripheries of the discs 22 are serrated as indicated at 22a.

The top wall 14, I shall term as a guard the purpose of which will be described in the operation of my device.

The blade 18 has a downwardly curved portion 30, which will also be described in the operation.

Practical operation

In the operation of my device, the discs 22 act as breaker or fracturing members when the device is used as shown in Figure 5. These breaker members 22 are forced through the hulls 40 of kernels of corn on the cob 38 and the device is moved in the direction of the arrow 32, whereby these hulls are fractured.

Referring to Figure 6, the edible portion of the kernel of corn is indicated at 34, within the hull 36. As the huller is moved in the direction of the arrow 32, the curved portion 30 of the blade 18 engages the kernels of corn successively and forces their upper ends toward the discs 22 as indicated at C in Figure 5 which further helps to fracture the hull of the kernel.

The sharpened notches 22a of the discs 22 materially help to fracture the hulls 36 of the kernels 34.

The hull 36 has a tendency to stay on the cob 38 as indicated at D in Figure 5 and the portion 30 of the blade 18 merely squeezes the hull 36 forcing the kernel 34 out of the hull. At C the kernel 34 is illustrated as being partially forced out of its hull. Continued movement of the huller completely disengages the kernel from the hull as indicated at E whereby the hull is left on the cob 38 as indicated at D.

Green corn, of course, has quite a bit of water in it and this water has a tendency to splatter out in drops as indicated at 40. The guard 14 serves to prevent these drops from splattering in an undesirable manner on the operator or out of a bowl in which the corn is being dropped after being hulled. The walls 12 and 16 help somewhat in guarding against undesirable splattering of the drops 40.

The discs 22 are made of thin metal so as to fracture the hulls of the kernels in an efficient manner and their edges being notched eliminates all necessity of sharpening them so that they will readily fracture the kernel hulls.

I have found the serrations especially desirable for effectively fracturing the hulls of sweet corn in the early fall and the huller can also be used for field corn. After field corn has been prepared by the huller its taste is substantially the same as sweet corn.

My huller may be used either by the individual at the dining table or as a kitchen utensil. It can be used on both cooked and uncooked corn and is especially desirable for canning purposes.

Since the discs rotate in the slots 26 and fit snugly against the sides of the slots, rotation of the discs will keep them free from kernels, which might otherwise collect on them.

Various changes may be made in the construction on my device without departing from the purpose of providing a device for removing the edible portions of kernels of green corn from their hulls and it is my purpose to cover by my claims, any modified forms of structure or use of mechanical equivalents, which may be reasonably included within their scope.

I claim as my invention:

1. In a corn huller, a rectangular open sided frame of flat material having an open part, one edge of which acts as a kernel extractor and the other edge being slotted and provided with a shaft and a plurality of discs on said shaft and extending through said slots.

2. In a corn huller, a rectangular open sided frame of flat material having a handle extending from one corner thereof and having an open part, one edge of which acts as a kernel extractor and the other edge being slotted and provided with a shaft and a plurality of discs having serrated peripheries on said shaft and extending through said slots.

3. A device of the class described, comprising a partial bottom wall terminating in a scraper edge, a front wall, a top wall, a back wall and a second partial bottom wall having a series of spaced slots therein, a series of discs mounted in said slots and a handle on said device.

4. A device of the class described, comprising a partial bottom wall terminating in a scraper edge, a front wall, a top wall, a back wall and a second partial bottom wall having a series of spaced slots therein and terminating in eyes, a shaft in said eyes, a disc on said shaft in each of said slots and a handle on said device.

Des Moines, Iowa, September 18, 1929.

LEW A. HURLBURT.